United States Patent
Nakamura

(10) Patent No.: US 6,516,347 B1
(45) Date of Patent: Feb. 4, 2003

(54) NETWORK DEVICE SETTING MANAGEMENT SYSTEM, NETWORK DEVICE SETTING MANAGEMENT METHOD, AND RECORDING MEDIUM RECORDING THEREON NETWORK DEVICE SETTING MANAGEMENT PROGRAM

(75) Inventor: Takashi Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/475,089

(22) Filed: Dec. 30, 1999

(30) Foreign Application Priority Data

Jan. 14, 1999 (JP) ........................................... 11-007792

(51) Int. Cl.[7] ........................................... G06F 15/177
(52) U.S. Cl. ...................................... 709/221; 709/222
(58) Field of Search ................................ 709/220, 221, 709/222, 223, 224; 370/254; 707/100; 713/1

(56) References Cited

U.S. PATENT DOCUMENTS

| | | | | |
|---|---|---|---|---|
| 5,832,503 A | * | 11/1998 | Malik et al. ................ | 709/222 |
| 5,909,682 A | * | 6/1999 | Cowan et al. ............... | 707/100 |
| 5,926,463 A | * | 7/1999 | Ahearn et al. ............... | 370/254 |
| 6,220,768 B1 | * | 4/2001 | Barroux ....................... | 709/224 |
| 6,286,038 B1 | * | 9/2001 | Reichmeyer et al. ........ | 709/220 |
| 6,286,044 B1 | * | 9/2001 | Aoyama ...................... | 709/223 |
| 6,308,205 B1 | * | 10/2001 | Carcerano et al. .......... | 709/220 |
| 6,374,352 B1 | * | 4/2002 | Goldman et al. ............. | 713/1 |
| 6,389,129 B1 | * | 5/2002 | Cowan ........................ | 709/220 |

FOREIGN PATENT DOCUMENTS

JP            10-51488        2/1998

\* cited by examiner

*Primary Examiner*—Patrice Winder
(74) *Attorney, Agent, or Firm*—Young & Thompson

(57) ABSTRACT

A device control unit 12, in response to a user's instruction to register, registers a network device ID and setting information designated by the user into a device setting information table 31 and an alteration history table 32; reads, in response to the user's alteration instruction, setting information corresponding to the ID designated by the user out of the alteration history table 32; displays it on an input/output unit 2 to let the user alter it; updates the device setting information table 31; adds the alteration to the alteration history table 32; reads, in response to the user's instruction to have it reflected, setting information corresponding to the ID designated by the user out of the device setting information table 31; displays it on the input/output unit 2 to let the user confirm its contents; and transmits the confirmed setting information to the network device to have it reflected therein.

20 Claims, 8 Drawing Sheets

| ITEM NO. | DATE/HOUR OF REGISTRATION | DEVICE ID | IP ADDRESS | DEVICE NANE | PASSWORD | . . . | |
|---|---|---|---|---|---|---|---|
|  |  |  |  |  |  |  |  |
|  |  |  |  |  |  |  |  |
|  |  |  |  |  |  |  |  |

FIG. 3

| ITEM NO. | DATE/HOUR OF REGISTRATION/ ALTERATION | DEVICE ID | IP ADDRESS | DEVICE NANE | PASSWORD | . . . | |
|---|---|---|---|---|---|---|---|
|  |  |  |  |  |  |  |  |
|  |  |  |  |  |  |  |  |
|  |  |  |  |  |  |  |  |

FIG. 4

| ITEM NO. | DEVICE ID | REFLECTION TIME |
|---|---|---|
|  |  |  |
|  |  |  |
| ≈ | ≈ | ≈ |
|  |  |  |

FIG. 6

| ITEM NO. | DATE/HOUR OF ALTERATION | DEVICE ID | IP ADDRESS | DEVICE NANE | PASSWORD | ... | |
|---|---|---|---|---|---|---|---|
| | | | | | | | |
| | | | | | | | |
| ≈ | ≈ | ≈ | ≈ | ≈ | ≈ | ≈ | ≈ |
| | | | | | | | |

FIG. 8

NETWORK DEVICE SETTING MANAGEMENT SYSTEM, NETWORK DEVICE SETTING MANAGEMENT METHOD, AND RECORDING MEDIUM RECORDING THEREON NETWORK DEVICE SETTING MANAGEMENT PROGRAM

BACKGROUND OF THE INVENTION

1. Field of the Invention

The present invention relates to a network device setting management system, a network device setting management method, and a recording medium recording thereon a network device setting management program, all for managing in an integrated manner setting information including passwords, routing information and IP addresses individually held by various network devices connected to a computer network, such as hubs and routers.

2. Description of the Related Art

Conventionally, setting information for various network devices connected to a computer network is instantaneously reflected in that network as it is entered by the user of a specific input unit connected to that network.

For instance, the Japanese Patent Laid-open No. Hei 10-51488 discloses a system comprising a device information database for storing information including the IDs and model denominations of network devices such as terminals and routers; a device management table for storing the password of each such network device; a model-by-model management table for registration of setting modules to be executed for individual network devices; and a routing information setting unit for executing setting modules and automatically setting routing information for each network device on a designated route, wherein a route is designated with a mouse on a network configuration map displayed on a display unit, and routing information is thereby automatically set for network devices on that route.

The technique described in the Japanese Patent Laid-open No. Hei 10-51488 involves the problem that, because network device setting information entered by a user is instantaneously reflected in the network as it is, if the user enters wrong setting information by a typing error, communication trouble will occur on that network.

There is the further problem that, in the event of such communication trouble, it cannot be found out what kind of typing error the user committed to enter the wrong setting information or what kind of setting information the communication was based on.

There is the still further problem that no consideration is given to restoration of the network to its state of normal communication in the event of communication trouble.

SUMMARY AND OBJECTS OF THE INVENTION

An object of the present invention is to prevent communication trouble attributable to the entry of wrong setting information due to a typing error by a user from occurring in a network by temporarily storing entered network device setting information in a memory unit and having that information reflected in the network after its contents have been confirmed by the user who entered it instead of having the setting information entered by the user reflected instantaneously in the network as it is.

Another object of the invention is to hold the history of network device setting information and, should any communication trouble attributable to wrong setting information due to a typing error by a user occur, to reference that history to find out the setting information in use when normal communication was taking place in the network.

Still another object of the invention is to make possible, should any communication trouble attributable to wrong setting information due to a typing error by a user occur, ready restoration of the normal state of communication for the network.

A first network device setting management system according to the invention, intended for management by a computer connected to a network of setting information for a plurality of network devices connected to that network, the computer comprising: a device setting information table in which setting information for the plurality of network devices is registered; and a device control unit for entering, in response to an instruction to register setting information, the identifier of a network device the instruction to register refers to and setting information for having it reflected in that network device; registering these items of information, matched with each other, in the device setting information table; entering, in response to an instruction to have the setting information reflected, the identifier of a network device the reflection instruction refers to; reading setting information corresponding to the identifier out of the device setting information table and displaying it on an input/output unit; and transmitting, upon entry of a notice of confirmation of the displayed setting information, the displayed setting information to the network device to have it reflected therein.

A second network device setting management system according to the invention, intended for management by a computer connected to a network of setting information for a plurality of network devices connected to that network, the computer comprising: a device setting information table in which setting information for the plurality of network devices is registered; an alteration history table for recording the registration history of setting information in the device setting information table; and a device control unit for entering, in response to an instruction to register setting information, the identifier of a network device the instruction to register refers to and setting information for having it reflected in that network device; registering these items of information, matched with each other, in the device setting information table and the alteration history table; entering, in response to an instruction to alter the setting information, the identifier of a network device the alteration instruction refers to; reading at least one item of setting information corresponding to the identifier out of the alteration history table and displaying it on an input/output unit; entering the altered setting information; updating the setting information for the pertinent network device, registered in the device setting information table, with that altered setting information; adding the altered setting information to the alteration history table; entering, in response to an instruction to have the setting information reflected, the identifier of a network device the reflection instruction refers to; reading setting information corresponding to the identifier out of the device setting information table and displaying it on an input/output unit; and transmitting, upon entry of a notice of confirmation of the displayed setting information, the displayed setting information to the network device to have it reflected therein.

A third network device setting management system according to the invention is a version of the second network device setting management system, wherein the computer is provided with a schedule management table for recording the time of reflection of setting information registered in the device setting information table; and the device control unit enters, in response to an instruction to have the setting information reflected, the identifier of a network device and the reflection time of the setting information the reflection instruction refers to; registers these items of information, matched with each other, in the schedule management table; reads the identifier of a network device having reached the reflection time out of the schedule management table; reads setting information corresponding to the read-out identifier out of the device setting information table and displays it on an input/output unit; and transmits, upon entry of a notice of confirmation of the displayed setting information, the displayed setting information to the network device to have it reflected therein.

A fourth network device setting management system according to the invention is a version of the third network device setting management system, wherein the computer is provided with a backup setting information table for registering a backup of setting information for the network device and a device monitoring unit for monitoring any communication trouble that may occur in any of the network devices; and the device control unit enters, in response to an instruction to alter the setting information, the identifier of a network device the alteration instruction refers to; reads at least one item of setting information corresponding to the identifier out of the alteration history table and displays it on an input/output unit; enters the altered setting information and the backup setting information; updates the setting information for the pertinent network device, registered in the setting information table, with that altered setting information; adds the altered setting information to the alteration history table; registers the backup setting information in the backup setting information table; receives from the device monitoring unit the identifier of a network device with which any communication trouble has occurred; reads setting information corresponding to the identifier out of the backup setting information table; and transmits the read-out setting information to the network device to have it reflected therein.

BRIEF DESCRIPTION OF THE DRAWINGS

The invention will be understood more fully from the detailed description given here below and from the accompanying drawings of preferred embodiments of the invention, which, however, should not be regarded as limiting the invention but are merely intended to facilitate explanation and understanding.

FIG. 3 is a configurational diagram of the device setting information table 31 in the first through third preferred embodiments of the invention.

FIG. 4 is a configurational diagram of the alteration history table 32 in the first through third preferred embodiments of the invention.

FIG. 6 is a configurational diagram of the schedule information table 33 in the first through third preferred embodiments of the invention.

FIG. 8 is a configurational diagram of the backup setting information table 34 in the first through third preferred embodiments of the invention.

Here, it should be noted that like reference numerals represent like elements throughout the disclosure.

DETAILED DESCRIPTION OF THE PREFERRED EMBODIMENTS

Preferred embodiments of the present invention will be described in detail below with reference to accompanying drawings.

Figure 1:
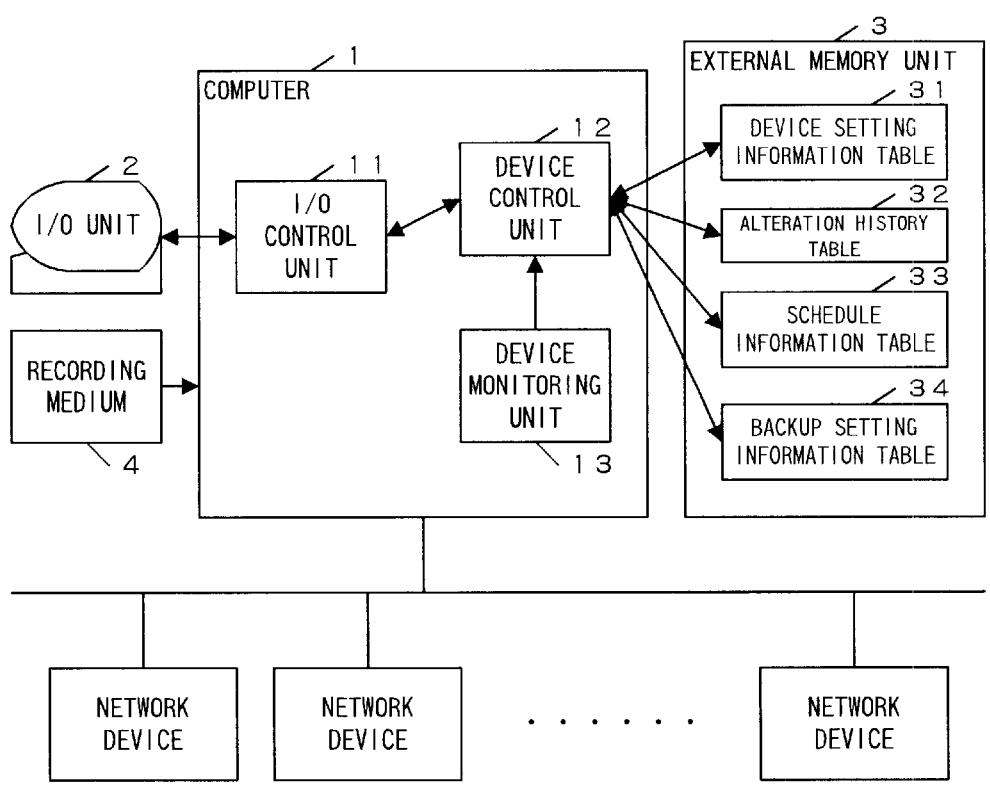
FIG. 1 is a block diagram illustrating first through third preferred embodiments of the invention.
Figure 2:
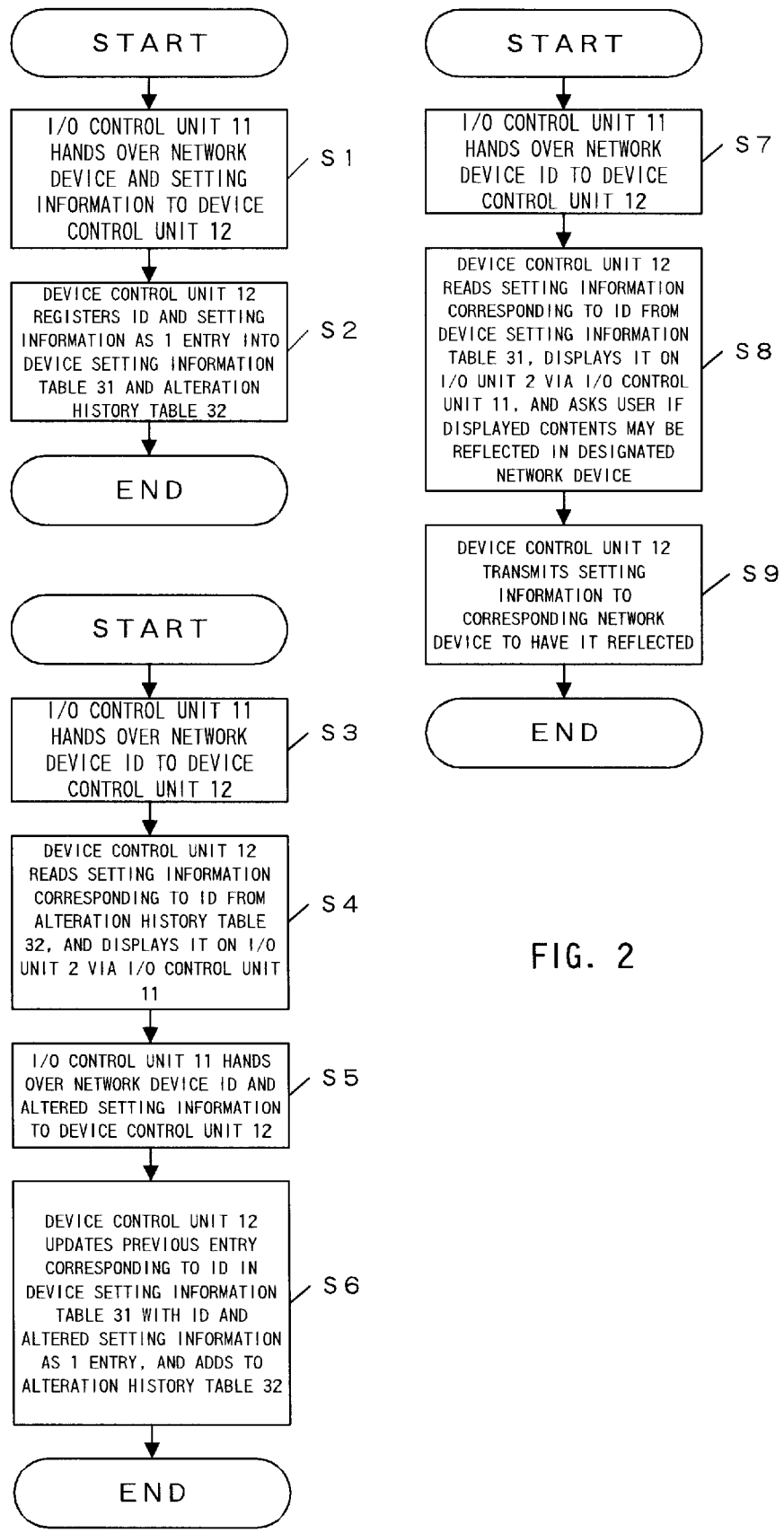
FIG. 2 is a flow chart illustrating the operation of the first preferred embodiment of the invention.
Figure 5:
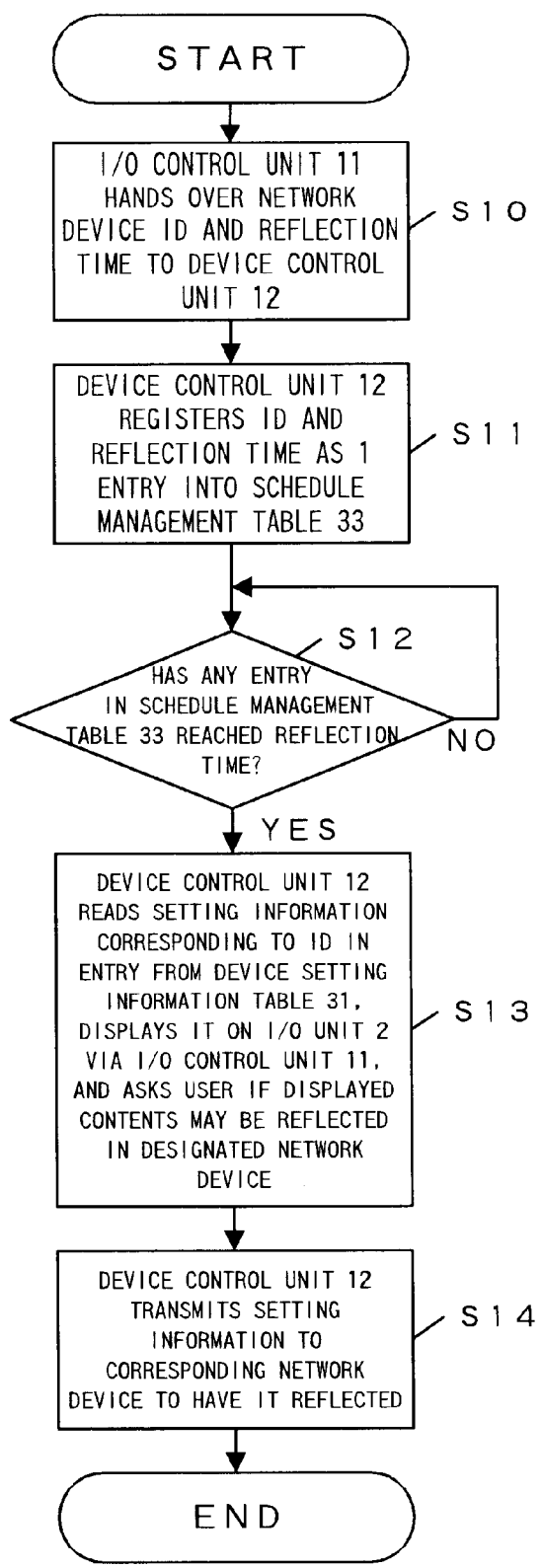
FIG. 5 is a flow chart illustrating the operation of the second preferred embodiment of the invention.
Figure 7:
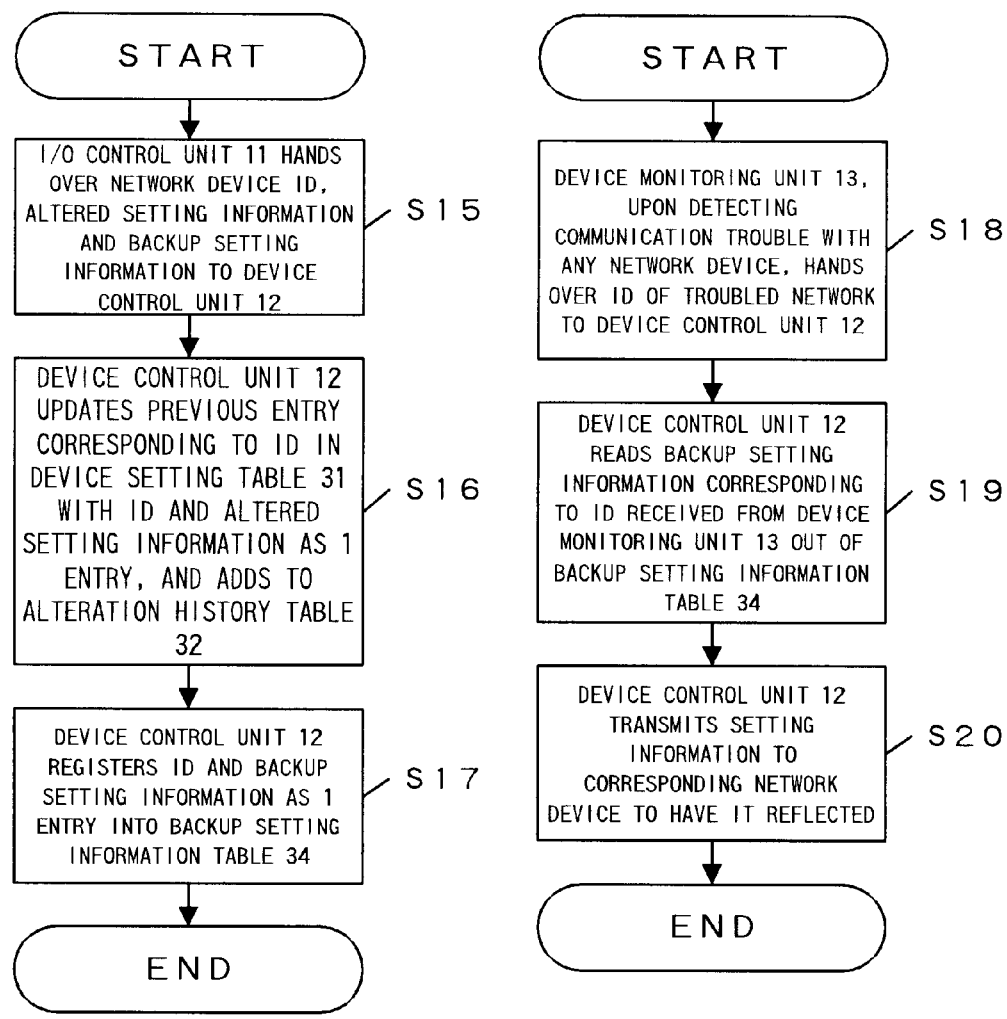
FIG. 7 is a flow chart illustrating the operation of the third preferred embodiment of the invention.

Referring to FIG. 1, in the first preferred embodiment of the invention, a computer 1 operating under programmed control is connected via a network to various network devices.

This computer 1 is provided with an input/output unit 2 and an external memory unit 3 (alternatively, these input/output unit 2 and external memory unit 3 may be connected via a network to the computer 1), and also includes an input/output control unit 11 and a device control unit 12.

The external memory unit 3 includes a device setting information table 31 whose configuration is shown in FIG. 3 and an alteration history table 32 whose configuration is shown in FIG. 4. As an alternative version of this first embodiment, the computer 1 and a recording medium 4, such as a magnetic disk unit or a semiconductor memory, may be connected to each other by a signal line, so that the computer 1 can execute the processing sequence described below in accordance with a program loaded from the recording medium 4 via the signal line.

Next will be described the operation of the first embodiment of the invention with reference to FIG. 1 through FIG. 4.

First will be described the processing by which setting information for a given network device is newly registered.

When a user enters through the input/output unit 2 an instruction to register setting information with the ID and setting information of the network device as the parameters, the input/output control unit 11 hands over the ID and setting information of the network device to the device control unit 12 (step S1).

The device control unit 12 registers into the device setting information table 31 and the alteration history table 32 the received ID and setting information of the network device as one entry (step S2).

Next will be described the processing to alter the setting information for the network device.

When a user enters through the input/output unit 2 an instruction to alter setting information with the ID of the network device as the parameter, the input/output control unit 11 hands over the ID of the network device to the device control unit 12 (step S3).

The device control unit 12 reads the pertinent setting information out of the alteration history table 32 with the received network device ID as the key, and displays it on the input/output unit 2 via the input/output control unit 11 (step S4). If a plurality of items of setting information corresponding to the network device ID are registered in the alteration history table 32 at step S4, all of them are read out and displayed on the input/output unit 2.

If the user alters at least one item of the network device setting information displayed on the input/output unit 2, the input/output control unit 11 hands over the ID of that network device and the altered setting information to the device control unit 12 (step S5).

The device control unit 12 updates the entry corresponding to the network device ID previously registered in the device setting information table 31 with the received network device ID and the altered setting information as one entry, and adds the entry to the alteration history table 32 (step S6).

Finally, the processing to have setting information reflected in a network device will be described.

When the user enters through the input/output unit 2 an instruction to have setting information reflected with the network device ID as the parameter, the input/output control unit 11 hands over the ID of the network device to the device control unit 12 (step S7).

The device control unit 12 reads out of the device setting information table 31 setting information corresponding to the received network device ID, displays it on the input/output unit 2 via the input/output control unit 11, and asks the user whether the displayed contents may be reflected in the designated network device (step S8).

If the user approves the contents of the setting information displayed on the input/output unit 2, the device control unit 12, having received this affirmative reply via the input/output control unit 11, transmits the setting information to the corresponding network device to have it reflected (step S9).

This completes the operation of the first preferred embodiment of invention.

To add, although processing for registration, alteration and reflection of one given network device was described above with respect to this embodiment, it is also possible for a user to register or alter through the input/output unit 2 items of setting information for a plurality of network devices collectively, and to cause the device control unit 12 to register them via a parameter input unit 11 into the device setting information table 31 and the alteration history table 32 collectively, and further (asynchronously with the registration processing) to transmit them to a corresponding group of network devices to have them reflected.

The first embodiment of the invention does not have user-entered setting information for a network device instantaneously reflected in the network as it is, but temporarily registers the setting information and displays it on a display unit to let the user concerned confirm its contents and only then causes the network to reflect it, thereby enabling the user to avoid erroneous entry (mistyping) of setting information with the resultant advantage of preventing communication trouble attributable to erroneous entry of setting information.

Figure 6:
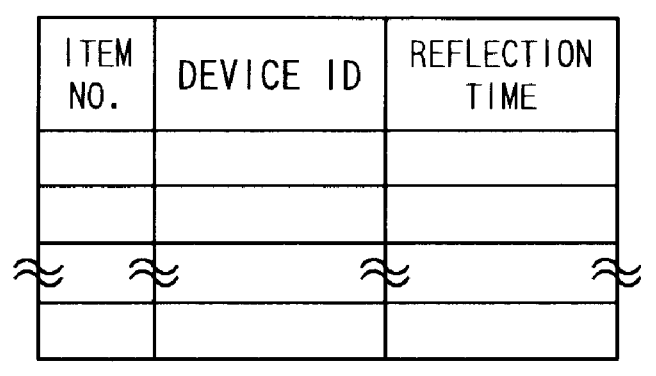

Referring to FIG. 1, in a second preferred embodiment of the present invention, the external memory unit 3 in the first embodiment further has a schedule information table 33 whose configuration is illustrated in FIG. 6.

To add, this second embodiment, too, like the first embodiment, may as well have an alternative version in which the computer 1 and a recording medium 4, such as a magnetic disk unit or a semiconductor memory, are connected to each other by a signal line, so that the computer 1 can execute the processing sequence described below in accordance with a program loaded from the recording medium 4 via the signal line.

Next will be described the operation of the second embodiment of the invention with reference to FIG. 1 through FIG. 6.

As a user, at step S7 for the first embodiment, enters through the input/output unit 2 an instruction to have setting information reflected with the network device ID and the reflection time of the setting information as the parameters, the input/output control unit 11 hands over the network device ID and the reflection time to the device control unit 12 (step S10).

The device control unit 12 registers into the schedule management table 33 the received network device ID and the reflection time as one entry (step S11).

The device control unit 12 checks at regular intervals of time whether or not any of the entries registered in the schedule management table 33 has reached the reflection time (step 12); if there is any such entry, it reads setting information corresponding to the network device ID contained in the entry out of the device setting information table 31, displays it on the input/output unit 2 via the input/output control unit 11, and asks the user whether the displayed contents may be reflected in the designated network device (step S13).

If the user approves the contents of the setting information displayed on the input/output unit 2, the device control unit 12, having received this affirmative reply via the input/output control unit 11, transmits the setting information to the corresponding network device to have it reflected (step S14).

This completes the operation of the second preferred embodiment of invention.

The second embodiment of the invention has the advantage, in addition to that of the first embodiment, of enabling the user to designate the time at which setting information is to be reflected in the network device.

Referring to FIG. 1, in a third preferred embodiment of the present invention, in addition to the configuration of the first or second embodiment, the computer 1 further has a device monitoring unit 13, and the external memory unit 3 further has a backup setting information table 34 whose configuration is illustrated in FIG. 8.

To add, this third embodiment, too, like the first or second embodiment, may as well have an alternative version in which the computer 1 and a recording medium 4, such as a magnetic disk unit or a semiconductor memory, are connected to each other by a signal line, so that the computer 1 can execute the processing sequence described below in accordance with a program loaded from the recording medium 4 via the signal line.

Next will be described the operation of the third embodiment of the invention with reference to FIG. 1 through FIG. 8.

At step S4 for the first embodiment, at least one item of setting information corresponding to the IDs of user-designated network devices is displayed on the input/output unit 2.

Then the user takes account of the possibility that, when any of those items of setting information is altered, reflection of the altered setting information in the network device may invite communication trouble, and designates the setting information into which the reflected setting information is to be reset (hereinafter, the setting information into which the reflected setting information is to be reset is referred to as backup setting information).

When the user alters through the input/output unit 2 any of the items of setting information and designates backup setting information, the input/output control unit 11 hands over the pertinent network device ID, the altered setting information and the backup setting information to the device control unit 12 (step S15)

The device control unit 12 updates the entry corresponding to the network device ID previously registered in the device setting information table 31 with the received network device ID and the altered setting information as one entry, adds the entry to the alteration history table 32 (step 16), and registers the received network device ID and the backup setting information as one entry into the backup setting information table 34 (step S17). Incidentally, the entry in the device setting information table 31 updated at step S16 and the entry in the backup setting information table 34 registered at step S17 may as well be matched with each other by a pointer or the like.

The device monitoring unit 13 monitors the state of communication of each network device by an unspecified known method and, if any communication trouble is detected, hands over the ID of the network device with which the communication trouble has occurred to the device control unit 12 (step 18).

The device control unit 12 reads backup setting information corresponding to the network device ID received from the device monitoring unit 13 out of the backup setting information table 34 (step 19), and transmits to the network device of that ID to have it reflected (step S20).

This completes the operation of the third preferred embodiment of invention.

The third embodiment of the invention has the advantage, in addition to those of the first and second embodiments, of making possible, even in the event of communication trouble attributable to the reflection of wrong setting information in a network device, ready restoration of the state in which normal communication was taking place.

As hitherto described, the present invention provides the advantage of preventing communication trouble attributable to the entry of wrong setting information due to a typing error by a user from occurring in a network by temporarily storing entered network device setting information in a memory unit and having that information reflected in the network after its contents have been confirmed by the user who entered it instead of having the setting information entered by the user reflected instantaneously in the network as it is.

The invention provides the further advantage of finding out the setting information in use when normal communication was taking place in the network by holding the history of network device setting information and, should any communication trouble attributable to wrong setting information due to a typing error by a user occur, referencing that history.

The invention provides the still further advantage of making possible, should any communication trouble attributable to wrong setting information due to a typing error by a user occur, ready restoration of the normal state in which normal communication was taking place in the network.

Although the invention has been described in detail so far with reference to various preferred embodiments thereof, it will be appreciated by those skilled in the art that these embodiments have been cited solely for the purposes of illustration, and are in no way to be regarded as limiting the invention. Instead, various modifications and substitutions of equivalent techniques will be readily apparent to those skilled in the art upon reading this specification, and such modifications and substitutions are to be regarded as falling within the true scope and spirit of the following claims.

What is claimed is:

1. A network device setting management system intended for management by a computer connected to a network of setting information for a plurality of network devices connected to that network, the computer comprises:

a device setting information table in which setting information for said plurality of network devices is registered; and a device control unit for entering, in response to an instruction to register setting information, the identifier of a network device the instruction to register refers to and setting information for having it reflected in that network device; registering these items of information, matched with each other, in said device setting information table; entering, in response to an instruction to have the setting information reflected, the identifier of a network device the reflection instruction refers to; reading setting information corresponding to the identifier out of said device setting information table and displaying it on an input/output unit; and transmitting, upon entry of a notice of confirmation of the displayed setting information, the displayed setting information to the network device to have it reflected therein.

2. A network device setting management system intended for management by a computer connected to a network of setting information for a plurality of network devices connected to that network, the computer comprising:

a device setting information table in which setting information for said plurality of network devices is registered;

an alteration history table for recording the registration history of setting information in said device setting information table; and a device control unit for entering, in response to an instruction to register setting information, the identifier of a network device the instruction to register refers to and setting information for having it reflected in that network device; registering these items of information, matched with each other, in said device setting information table and said alteration history table; entering, in response to an instruction to alter the setting information, the identifier of a network device the alteration instruction refers to; reading at least one item of setting information corresponding to the identifier out of said alteration history table and displaying it on an input/output unit; entering the altered setting information; updating the setting information for the pertinent network device, registered in said device setting information table, with that altered setting information; adding the altered setting information to said alteration history table; entering, in response to an instruction to have the setting information reflected, the identifier of a network device the reflection instruction refers to; reading setting information corresponding to the identifier out of said device setting information table and displaying it on an input/output unit; and transmitting, upon entry of a notice of confirmation of the displayed setting information, the displayed setting information to the network device to have it reflected therein.

3. A network device setting management system, as claimed in claim 2, wherein the computer is provided with:

a schedule management table for recording the time of reflection of setting information registered in said device setting information table; and said device control unit enters, in response to an instruction to have the setting information reflected, the identifier of a network device and the reflection time of the setting information the reflection instruction refers to; registers these items of information, matched with each other, in said schedule management table; reads the identifier of a network device having reached the reflection time out of the schedule management table; reads setting information corresponding to the read-out identifier out of said device setting information table and displays it on an input/output unit; and transmits, upon entry of a notice of confirmation of the displayed setting information, the displayed setting information to the network device to have it reflected therein.

4. A network device setting management system, as claimed in claim 3, wherein the computer is provided with:
   a backup setting information table for registering a backup of setting information for the network device; and
   a device monitoring unit for monitoring any communication trouble that may occur in any of the network devices; and
   said device control unit enters, in response to an instruction to alter the setting information, the identifier of a network device the alteration instruction refers to; reads at least one item of setting information corresponding to the identifier out of said alteration history table and displays it on an input/output unit; enters the altered setting information and the backup setting information; updates the setting information for the pertinent network device, registered in said device setting information table, with that altered setting information; adds the altered setting information to said alteration history table; registers the backup setting information in said backup setting information table; receives from said device monitoring unit the identifier of a network device with which any communication trouble has occurred; reads setting information corresponding to the identifier out of said backup setting information table; and transmits the read-out setting information to the network device to have it reflected therein.

5. A network device setting management method comprising:
   a registration step at which a computer connected to a network enters, in response to an instruction to register setting information, the identifier of a network device the instruction to register refers to and setting information for having it reflected in that network device; and registers these items of information, matched with each other, in a device setting information table; and
   a reflection step at which said computer enters, in response to an instruction to have the setting information reflected, the identifier of a network device the reflection instruction refers to; reads setting information corresponding to the identifier out of said device setting information table and displays it on an input/output unit; and transmits, upon entry of a notice of confirmation of the displayed setting information, the displayed setting information to the network device to have it reflected therein.

6. A network device setting management method comprising:
   a registration step at which a computer connected to a network enters, in response to an instruction to register setting information, the identifier of a network device the instruction to register refers to and setting information for having it reflected in that network device; and registers these items of information, matched with each other, in a device setting information table and an alteration history table;
   an alteration step at which said computer enters, in response to an instruction to alter the setting information, the identifier of a network device the alteration instruction refers to; reads at least one item of setting information corresponding to the identifier out of said alteration history table and displaying it on an input/output unit; enters the altered setting information; updates the setting information for the pertinent network device, registered in said device setting information table, with that altered setting information; and adds the altered setting information to said alteration history table; and
   a reflection step at which said computer enters, in response to an instruction to have the setting information reflected, the identifier of a network device the reflection instruction refers to; reads setting information corresponding to the identifier out of said device setting information table and displays it on an input/output unit; and transmits, upon entry of a notice of confirmation of the displayed setting information, the displayed setting information to the network device to have it reflected therein.

7. A network device setting management method comprising:
   a registration step at which a computer connected to a network enters, in response to an instruction to register setting information, the identifier of a network device the instruction to register refers to and setting information for having it reflected in that network device; and registers these items of information, matched with each other, in a device setting information table and an alteration history table;
   an alteration step at which said computer enters, in response to an instruction to alter the setting information, the identifier of a network device the alteration instruction refers to; reads at least one item of setting information corresponding to the identifier out of said alteration history table and displaying it on an input/output unit; enters the altered setting information; updates the setting information for the pertinent network device, registered in said device setting information table, with that altered setting information; and adds the altered setting information to said alteration history table; and
   a reflection step at which said computer enters, in response to an instruction to have the setting information reflected, the identifier of a network device and the reflection time of the setting information the reflection instruction refers to; registers these items of information, matched with each other, in a schedule management table; reads the identifier of a network device having reached the reflection time out of the schedule management table; reads setting information corresponding to the read-out identifier out of said device setting information table and displays it on an input/output unit; and transmits, upon entry of a notice of confirmation of the displayed setting information, the displayed setting information to the network device to have it reflected therein.

8. A network device setting management method comprising:
   a registration step at which a computer connected to a network enters, in response to an instruction to register setting information, the identifier of a network device the instruction to register refers to and setting information for having it reflected in that network device; and registers these items of information, matched with each other, in a device setting information table and an alteration history table;

an alteration step at which said computer enters, in response to an instruction to alter the setting information, the identifier of a network device the alteration instruction refers to; reads at least one item of setting information corresponding to the identifier out of said alteration history table and displays it on an input/output unit; enters the altered setting information and the backup setting information; updates the setting information for the pertinent network device, registered in said device setting information table, with that altered setting information; adds the altered setting information to said alteration history table; and registers the backup setting information in said backup setting information table;

a reflection step at which said computer enters, in response to an instruction to have the setting information reflected, the identifier of a network device and the reflection time of the setting information the reflection instruction refers to; registers these items of information, matched with each other, in a schedule management table; reads the identifier of a network device having reached the reflection time out of the schedule management table; reads setting information corresponding to the read-out identifier out of said device setting information table and displays it on an input/output unit; and transmits, upon entry of a notice of confirmation of the displayed setting information, the displayed setting information to the network device to have it reflected therein;

a device monitoring step at which said computer monitors communication trouble that may occur in any network device; and a backup step at which said computer reads setting information corresponding to the identifier of the network device in which communication trouble was detected at said device monitoring step out of said backup setting information table; and transmits the read-out setting information to the network device to have it reflected therein.

9. A recording medium recording thereon a program to cause a computer connected to a network to perform:

registration processing to enter, in response to an instruction to register setting information, the identifier of a network device the instruction to register refers to and setting information for having it reflected in that network device; and to register these items of information, matched with each other, in a device setting information table; and reflection processing to enter, in response to an instruction to have the setting information reflected, the identifier of a network device the reflection instruction refers to; to read setting information corresponding to the identifier out of said device setting information table and to display it on an input/output unit; and to transmit, upon entry of a notice of confirmation of the displayed setting information, the displayed setting information to the network device to have it reflected therein.

10. A group of recording media wherein said program, as claimed in claim 9, is divided into a plurality of portions, each of which is recorded on one of the plurality of recording media.

11. A recording medium recording thereon a program to cause a computer connected to a network to perform:

registration processing to enter, in response to an instruction to register setting information, the identifier of a network device the instruction to register refers to and setting information for having it reflected in that network device; and to register these items of information, matched with each other, in a device setting information table and an alteration history table;

alteration processing to enter, in response to an instruction to alter the setting information, the identifier of a network device the alteration instruction refers to; to read at least one item of setting information corresponding to the identifier out of said alteration history table and to display it on an input/output unit; to enter the altered setting information; to update the setting information for the pertinent network device, registered in said device setting information table, with that altered setting information; and to add the altered setting information to said alteration history table; and reflection processing to enter, in response to an instruction to have the setting information reflected, the identifier of a network device the reflection instruction refers to; to read setting information corresponding to the identifier out of said device setting information table and to display it on an input/output unit; and to transmit, upon entry of a notice of confirmation of the displayed setting information, the displayed setting information to the network device to have it reflected therein.

12. A group of recording media wherein said program, as claimed in claim 11, is divided into a plurality of portions, each of which is recorded on one of the plurality of recording media.

13. A recording medium recording thereon a program to cause a computer connected to a network to perform:

registration processing to enter, in response to an instruction to register setting information, the identifier of a network device the instruction to register refers to and setting information for having it reflected in that network device; and to register these items of information, matched with each other, in a device setting information table and an alteration history table;

alteration processing to enter, in response to an instruction to alter the setting information, the identifier of a network device the alteration instruction refers to; to read at least one item of setting information corresponding to the identifier out of said alteration history table and to display it on an input/output unit; to enter the altered setting information; to update the setting information for the pertinent network device, registered in said device setting information table, with that altered setting information; and to add the altered setting information to said alteration history table; and reflection processing to enter, in response to an instruction to have the setting information reflected, the identifier of a network device and the reflection time of the setting information the reflection instruction refers to; to register these items of information, matched with each other, in a schedule management table; to read the identifier of a network device having reached the reflection time out of the schedule management table; to read setting information corresponding to the read-out identifier out of said device setting information table and to display it on an input/output unit; and to transmit, upon entry of a notice of confirmation of the displayed setting information, the displayed setting information to the network device to have it reflected therein.

14. A group of recording media wherein said program, as claimed in claim 13, is divided into a plurality of portions, each of which is recorded on one of the plurality of recording media.

15. A recording medium recording thereon a program to cause a computer connected to a network to perform:

registration processing to enter, in response to an instruction to register setting information, the identifier of a network device the instruction to register refers to and setting information for having it reflected in that network device; and to register these items of information, matched with each other, in a device setting information table and an alteration history table;

alteration processing to enter, in response to an instruction to alter the setting information, the identifier of a network device the alteration instruction refers to; to read at least one item of setting information corresponding to the identifier out of said alteration history table and to display it on an input/output unit; enters the altered setting information and the backup setting information; to update the setting information for the pertinent network device, registered in said device setting information table, with that altered setting information; to add the altered setting information to said alteration history table; and to register the backup setting information in said backup setting information table;

reflection processing to enter, in response to an instruction to have the setting information reflected, the identifier of a network device and the reflection time of the setting information the reflection instruction refers to; to register these items of information, matched with each other, in a schedule management table; to read the identifier of a network device having reached the reflection time out of the schedule management table; to read setting information corresponding to the read-out identifier out of said device setting information table and to display it on an input/output unit; and to transmit, upon entry of a notice of confirmation of the displayed setting information, the displayed setting information to the network device to have it reflected therein;

device monitor processing to monitor communication trouble that may occur in any network device; and backup processing to read setting information corresponding to the identifier of the network device in which communication trouble was detected by said device monitor processing out of said backup setting information table; and to transmit the read-out setting information to the network device to have it reflected therein.

16. A group of recording media wherein said program, as claimed in claim 15, is divided into a plurality of portions, each of which is recorded on one of the plurality of recording media.

17. A program embodied in electric signals, enabling a computer connected to a network to process:

a registration step at which the computer connected to the network enters, in response to an instruction to register setting information, the identifier of a network device the instruction to register refers to and setting information for having it reflected in that network device; and registers these items of information, matched with each other, in a device setting information table; and a reflection step at which said computer enters, in response to an instruction to have the setting information reflected, the identifier of a network device the reflection instruction refers to; reads setting information corresponding to the identifier out of said device setting information table and displays it on an input/output unit; and transmits, upon entry of a notice of confirmation of the displayed setting information, the displayed setting information to the network device to have it reflected therein.

18. A program embodied in electric signals, enabling a computer connected to a network to process:

a registration step at which the computer connected to the network enters, in response to an instruction to register setting information, the identifier of a network device the instruction to register refers to and setting information for having it reflected in that network device; and registers these items of information, matched with each other, in a device setting information table and an alteration history table;

an alteration step at which said computer enters, in response to an instruction to alter the setting information, the identifier of a network device the alteration instruction refers to; reads at least one item of setting information corresponding to the identifier out of said alteration history table and displaying it on an input/output unit; enters the altered setting information; updates the setting information for the pertinent network device, registered in said device setting information table, with that altered setting information; and adds the altered setting information to said alteration history table; and a reflection step at which said computer enters, in response to an instruction to have the setting information reflected, the identifier of a network device the reflection instruction refers to; reads setting information corresponding to the identifier out of said device setting information table and displays it on an input/output unit; and transmits, upon entry of a notice of confirmation of the displayed setting information, the displayed setting information to the network device to have it reflected therein.

19. A program embodied in electric signals, enabling a computer connected to a network to process:

a registration step at which the computer connected to the network enters, in response to an instruction to register setting information, the identifier of a network device the instruction to register refers to and setting information for having it reflected in that network device; and registers these items of information, matched with each other, in a device setting information table and an alteration history table;

an alteration step at which said computer enters, in response to an instruction to alter the setting information, the identifier of a network device the alteration instruction refers to; reads at least one item of setting information corresponding to the identifier out of said alteration history table and displaying it on an input/output unit; enters the altered setting information; updates the setting information for the pertinent network device, registered in said device setting information table, with that altered setting information; and adds the altered setting information to said alteration history table; and a reflection step at which said computer enters, in response to an instruction to have the setting information reflected, the identifier of a network device and the reflection time of the setting information the reflection instruction refers to; registers these items of information, matched with each other, in a schedule management table; reads the identifier of a network device having reached the reflection time out of the schedule management table; reads setting information corresponding to the read-out identifier out of said device setting information table and displays it on an input/output unit; and transmits, upon entry of a notice of confirmation of the displayed setting information, the displayed setting information to the network device to have it reflected therein.

20. A program embodied in electric signals, enabling a computer connected to a network to process:

a registration step at which the computer connected to the network enters, in response to an instruction to register setting information, the identifier of a network device the instruction to register refers to and setting information for having it reflected in that network device; and registers these items of information, matched with each other, in a device setting information table and an alteration history table;

an alteration step at which said computer enters, in response to an instruction to alter the setting information, the identifier of a network device the alteration instruction refers to; reads at least one item of setting information corresponding to the identifier out of said alteration history table and displays it on an input/output unit; enters the altered setting information and the backup setting information; updates the setting information for the pertinent network device, registered in said device setting information table, with that altered setting information; adds the altered setting information to said alteration history table; and registers the backup setting information in said backup setting information table;

a reflection step at which said computer enters, in response to an instruction to have the setting information reflected, the identifier of a network device and the reflection time of the setting information the reflection instruction refers to; registers these items of information, matched with each other, in a schedule management table; reads the identifier of a network device having reached the reflection time out of the schedule management table; reads setting information corresponding to the read-out identifier out of said device setting information table and displays it on an input/output unit; and transmits, upon entry of a notice of confirmation of the displayed setting information, the displayed setting information to the network device to have it reflected therein;

a device monitoring step at which said computer monitors communication trouble that may occur in any network device; and a backup step at which said computer reads setting information corresponding to the identifier of the network device in which communication trouble was detected at said device monitoring step out of said backup setting information table; and transmits the read-out setting information to the network device to have it reflected therein.

* * * * *